US008345780B2

(12) United States Patent
Chauncey et al.

(10) Patent No.: US 8,345,780 B2
(45) Date of Patent: Jan. 1, 2013

(54) WIRELESS COMMUNICATION SYSTEM COMPENSATING FOR INTERFERENCE AND RELATED METHODS (75) Inventors: David Chauncey, Fairport, NY (US); Mitel Kuliner, Rochester, NY (US); Elias Theodorou, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1246 days.

(21) Appl. No.: 12/132,757

(22) Filed: Jun. 4, 2008

(65) Prior Publication Data
US 2009/0304095 A1 Dec. 10, 2009

(51) Int. Cl.
H04K 1/10 (2006.01)
(52) U.S. Cl. ........ 375/260; 375/259; 375/219; 375/295; 375/316; 375/346; 375/350; 370/328; 370/335; 370/342; 370/310
(58) Field of Classification Search .................. 375/260, 375/259, 219, 295, 316, 346, 350; 370/328, 370/335, 342, 310
See application file for complete search history.

(56) References Cited

U.S. PATENT DOCUMENTS

| 6,115,409 | A | 9/2000 | Upadhyay et al. | 375/144 |
|---|---|---|---|---|
| 7,039,417 | B2 | 5/2006 | Lyle et al. | 455/452.2 |
| 2002/0155811 | A1 | 10/2002 | Prismantas et al. | 455/63 |
| 2004/0028003 | A1 | 2/2004 | Diener et al. | 370/319 |
| 2006/0153283 | A1* | 7/2006 | Scharf et al. | 375/148 |
| 2008/0299932 | A1* | 12/2008 | Belogolovy et al. | 455/296 |
| 2009/0124205 | A1* | 5/2009 | Aboba et al. | 455/63.1 |

FOREIGN PATENT DOCUMENTS

| WO | 99/39444 | 8/1999 |
|---|---|---|
| WO | 01/73956 | 10/2001 |

OTHER PUBLICATIONS www.redlinecommunications.com, RedCONNEX AN-80i Advanced Broadband Wireless Infrastructure Solution.

* cited by examiner

Primary Examiner — Zewdu Kassa
(74) Attorney, Agent, or Firm — Allen, Dyer, Doppelt, Milbrath & Gilchrist, P.A.

(57) ABSTRACT

A wireless communication system may include first and second wireless communications devices communicating with one another via a wireless communications link having a settable link characteristic. The first and second wireless communications devices may include respective first and second wireless transceivers and respective first and second controllers coupled thereto. The first controller may be for detecting received interference, for determining a type of the interference from among interference types comprising wideband interference and narrowband interference, and for setting the settable link characteristic to compensate for the interference based upon the interference type.

14 Claims, 6 Drawing Sheets

WIRELESS COMMUNICATION SYSTEM COMPENSATING FOR INTERFERENCE AND RELATED METHODS

FIELD OF THE INVENTION

The present invention relates to the field of communications, and, more particularly, to interference compensation and related methods.

BACKGROUND OF THE INVENTION

As wireless communications has become prevalent in society, it is not uncommon for two wireless communications devices to interfere with the operation of each other when operating within transmission range of each other. Indeed, this type of interference has become more frequent with increasing wireless connectivity permeating society, such as, cellular phones and mobile email devices. For example, when IEEE 802.11b (WiFi) wireless devices, for example, laptop computers, became readily available to the home consumer, "cordless" home telephones were capable of rendering the WiFi devices inoperable due to interference.

Interference is typically categorized into two types: narrowband interference and wideband interference. Narrowband interference includes forms of interference that are concentrated around a relatively small frequency bandwidth. Several common approaches to compensating for narrowband interference may include, for example, forward error correction (FEC), baseband coding (FHSS/DSSS spread spectrum), diversity in frequency and/or time, and signal cancellation.

Differently, wideband interference includes forms of interference that are spread out across a relatively large frequency bandwidth. Several common approaches to compensating for wideband interference may include, for example, FEC, adaptive data rate (modulation and channel bandwidth), adaptive power control, diversity in frequency and/or timer and signal cancellation.

Another common type of interference is self interference. Common causes of self interference may include, for example, collocation or frequency reuse. In particular, collocation may be caused by two wireless communication systems being deployed too closely together while frequency reuse may be caused by two wireless communication systems using the same frequency band/channel. Several approaches to compensating for self interference, which are available during planning and development stages of wireless communication systems, include, for example, installation (isolation between antennas), frequency planning, antenna pattern manipulation, synchronization of transmitters, and filtering (duplexing).

Although interference is commonly generated inadvertently, another frequent source may be intentionally created by an unauthorized user, e.g. a jammer. Indeed, similar to the cordless home telephone, the unauthorized user may render a wireless communication system inoperable or may reduce the effectiveness, for example, capacity, of the wireless communication system.

Regardless of the source, there is a desire to reduce the effect of interference in communications. For example, high spectral efficiency wireless communications devices, for example, an RF-7800W-OU440, as available from the Harris Corporation of Melbourne, Fla., the assignee of the present application, use high signal-to-noise ratio transmissions and may be susceptible to interference.

An approach to interference in wireless communication systems may be interference compensation. For example, frequency diversity may used to compensate for the interference by adjusting the operating frequency of the wireless communications device to a frequency free of the interference. Another approach to interference compensation is spatial diversity using a plurality of antennas. In this approach, the undesired interference is canceled out using the time shifted variants received at each antenna.

Another approach to interference compensation is disclosed in U.S. Pat. No. 6,115,409 to Upadhyay et al. This system includes an array of antennas for spatial diversity. The system uses the spatial diversity to cancel out the interference. Moreover, the system uses spatial and temporal filters to cancel out wideband and narrowband interference in the antenna array.

Another approach to interference compensation is disclosed in U.S. Pat. No. 7,039,417 to Lyle et al. The system of Lyle et al. cycles through available channels and evaluates the presence of interference on each channel. The system may also determine the type of electronic device causing the interference, i.e. a cell phone or a microwave. The system assigns a quality-of-service parameter for the channel and moves on to the next channel. Using the table of service parameters for each available channel, the system may select a channel that is interference free or subject to low levels of interference. In other words, this system uses frequency diversity to compensate for interference.

SUMMARY OF THE INVENTION

In view of the foregoing background, it is therefore an object of the present invention to provide effective interference compensation.

This and other objects, features, and advantages in accordance with the present invention are provided by a wireless communication system comprising first and second wireless communications devices communicating with one another via a wireless communications link having at least one settable link characteristic. The first and second wireless communications devices may include respective first and second orthogonal frequency-division multiplexing (OFDM) wireless transceivers and respective first and second controllers coupled thereto. The first controller may be for detecting received interference, for determining a type of the received interference from among a plurality of interference types comprising wideband interference and narrowband interference, and for setting the at least one settable link characteristic to compensate for the received interference based upon the interference type. Advantageously, the wireless communication system may provide efficient interference compensation based upon the interference type.

The plurality of interference types may further include self interference. Moreover, the first controller may detect the received interference based upon a comparison of a current received signal to at least one prior received signal. The first controller may also repeat the detecting, determining, and setting.

More particularly, the at least one settable link characteristic may comprise at least one receive processing characteristic. The at least one settable link characteristic may comprise at least one transmit processing characteristic. In some embodiments, the first controller may cooperate with the second controller to set the at least one transmit processing characteristic.

Further, the first controller may generate an interference map of the received interference onto OFDM cells. The first controller may set the at least one settable link characteristic based upon the interference map.

The first controller may determine the interference type based upon at least one of fade characteristics, noise characteristics, and path characteristics. For example, the at least one settable link characteristic may comprise at least one of transmission power, frequency diversity, time diversity, modulation, forward error correction (FEC), channel bandwidth, and adaptive filtering.

Another aspect is directed to a method for compensating interference in a wireless communication system comprising first and second OFDM wireless communications devices communicating with one another via a wireless communications link having at least one settable link characteristic. The method may comprise detecting received interference, determining a type of the interference from among a plurality of interference types comprising wideband interference and narrowband interference, and setting the at least one settable link characteristic to compensate for the interference based upon the interference type.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
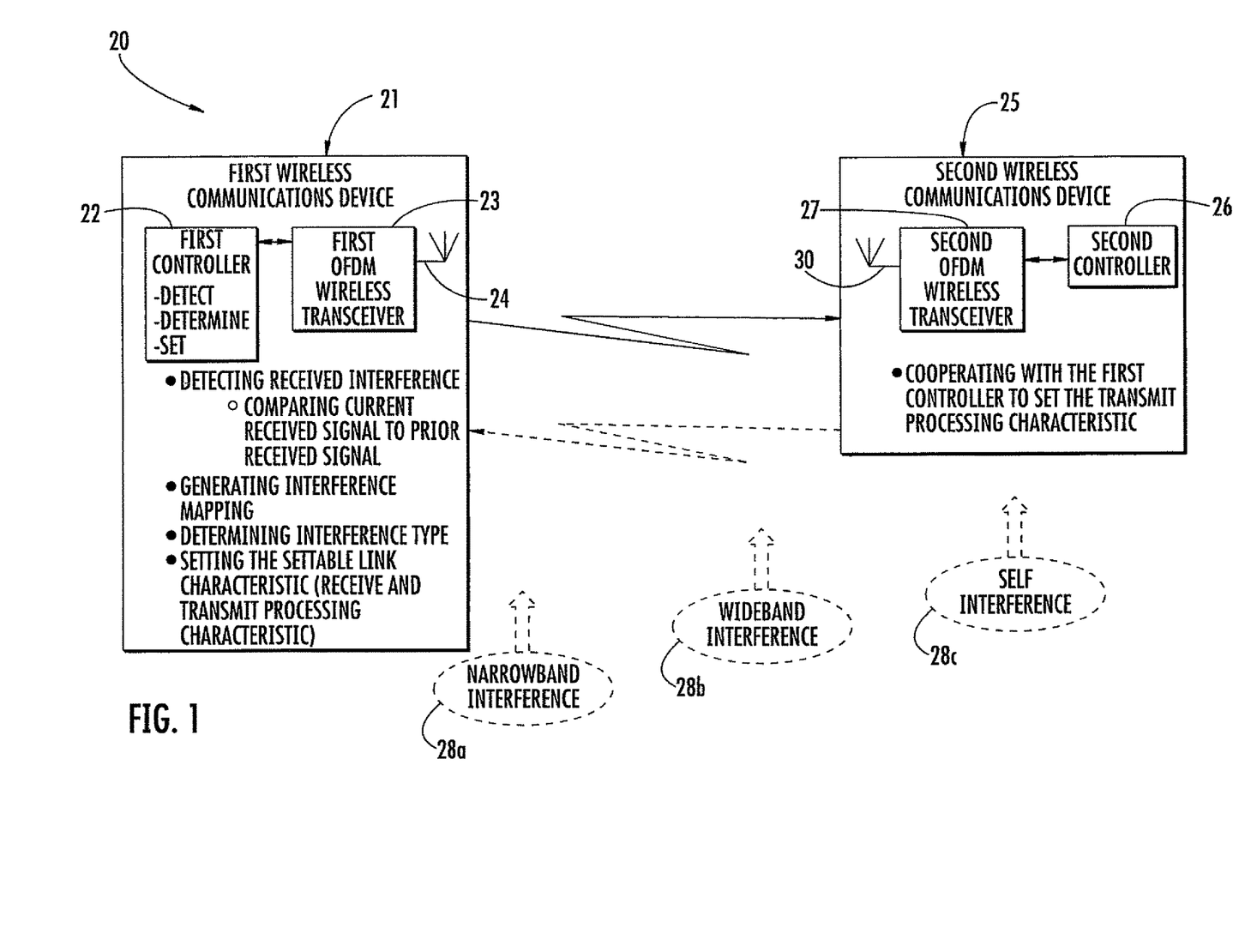
FIG. 1 is a schematic diagram of the wireless communication system according to the present invention.
Figure 2:
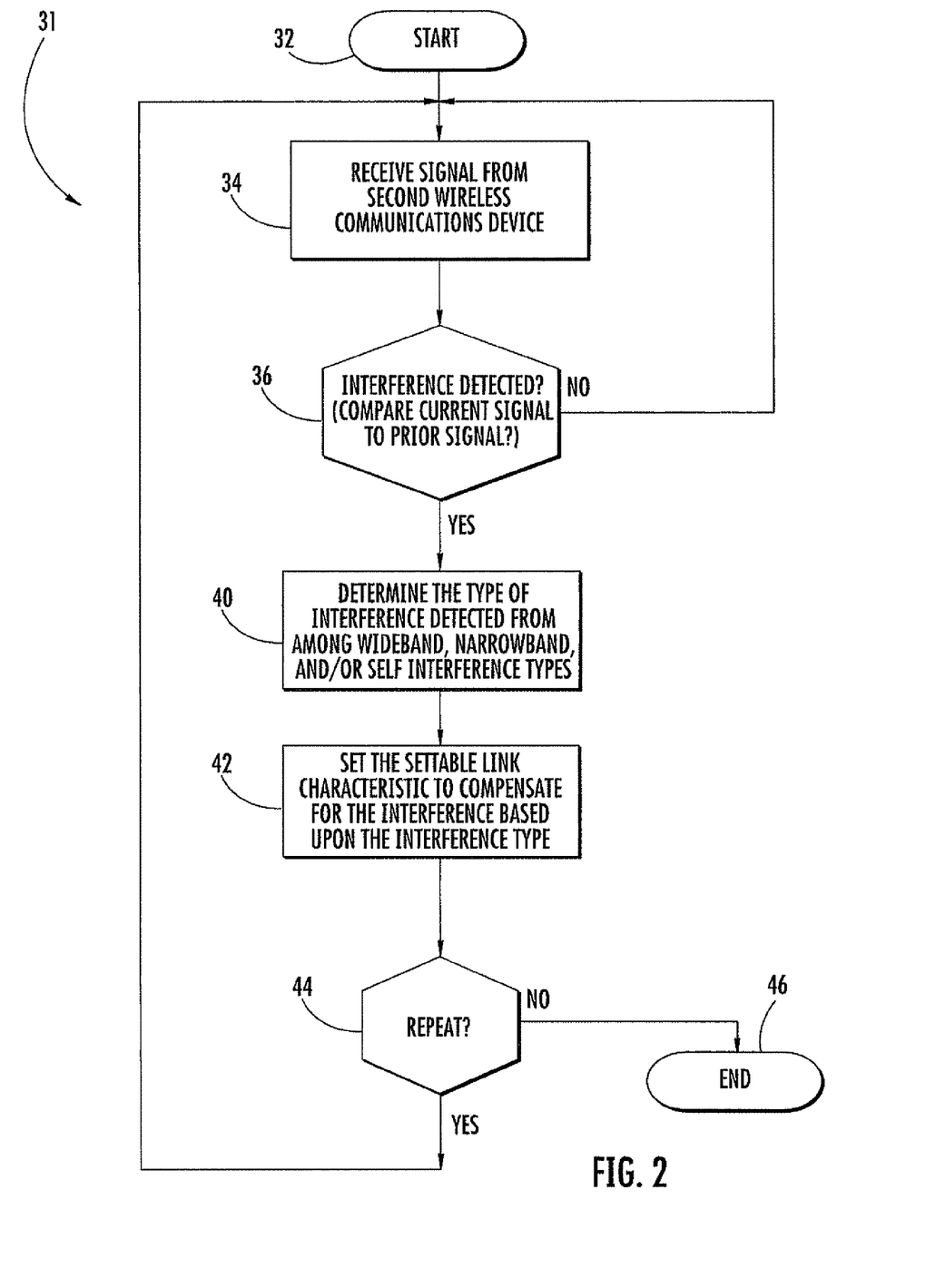
FIG. 2 is a flowchart of a method for compensating interference in the wireless communication system of FIG. 1.

Referring initially to FIGS. 1-2, a wireless communication system 20 illustratively includes first 21 and second 25 wireless communications devices. Additionally, the wireless communication system 20 may include more than two wireless communications devices and/or a wireless base station. Alternatively, the wireless communication system 20 may include only one wireless communications device and a wireless base station. The first 21 and second 25 wireless communications devices illustratively communicate with one another via a wireless communications link having a plurality of settable link characteristics. For example, the settable link characteristics include at least one of transmission power, frequency diversity, time diversity, modulation, forward error correction (FEC), channel bandwidth, and adaptive filtering.

The first and second wireless communications devices 21, 25 illustratively include first and second wireless transceivers 23, 27, respective first and second controllers 22, 26 coupled to the wireless transceivers, and respective first and second antennas 24, 30 coupled to the wireless transceivers. The first and second wireless transceivers 23, 27 illustratively comprise respective first and second orthogonal frequency-division multiplexing (OFDM) transceivers.

The method for compensating interference 28a-28c in the wireless communication system 20 begins at Block 32, the first wireless communications device 21 receives a transmission from the second wireless communications device 25 at Block 34. Illustratively, the transmission from the first wireless communications device 21 to the second wireless communications device 25 is problem free (shown with solid line). Differently, the return transmission is subject to interference 28a-28c from an unknown source (shown with dashed line). At decision Block 36, the first controller 22 illustratively detects whether there is any received interference 28a-28c. The first controller 22 may detect the received interference 28a-28c based upon a comparison of a current received signal to at least one prior received signal.

More specifically, the first controller 22 may store data associated with past performance of the received signal and compare the current received signal with the stored data to determine whether there is any received interference 28a-28c. If no interference 28a-28c with the return transmission is detected, the first wireless communications device 21 makes no adjustments and returns to Block 34 to continue to receive the return transmission and transmit any remaining data.

Figure 3:
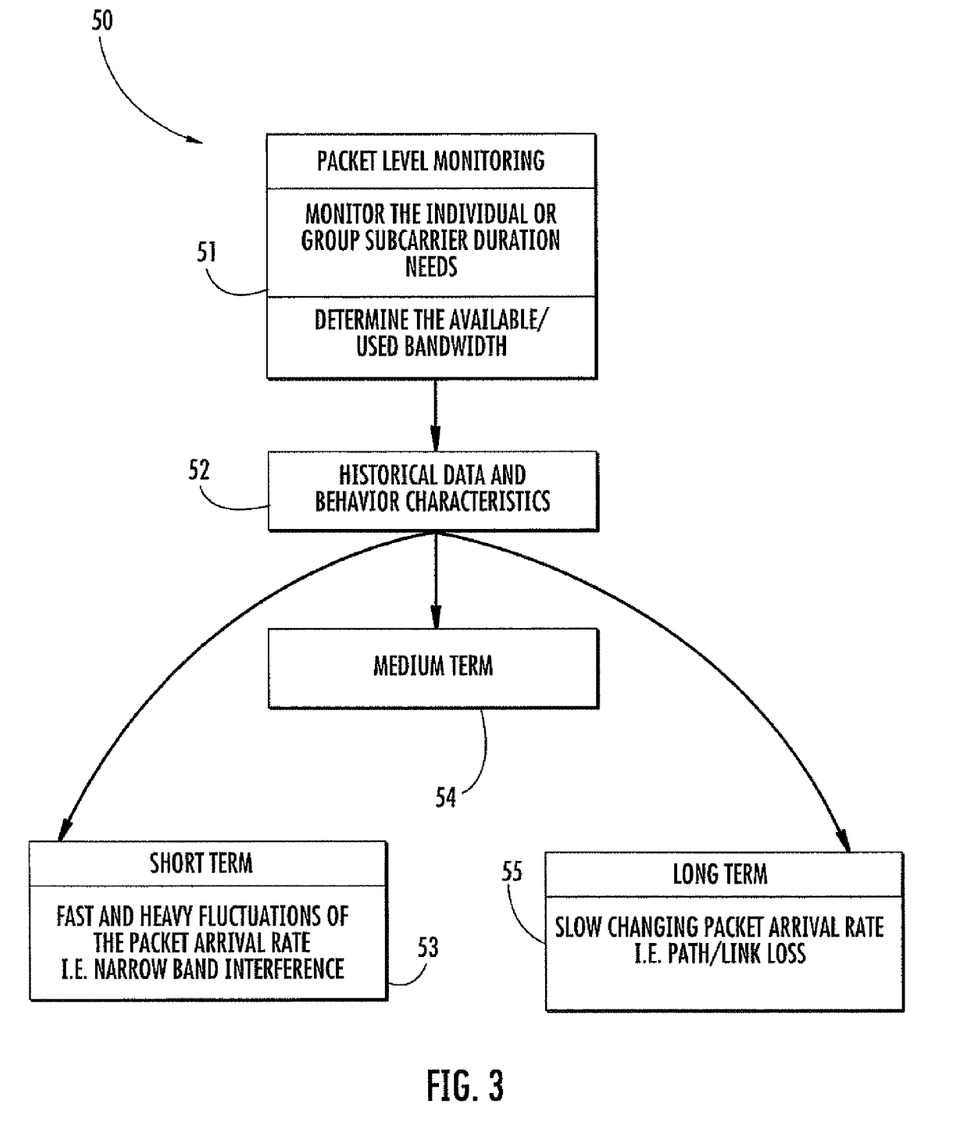
FIG. 3 is a block diagram for an embodiment of the detection of interference according to the present invention.

Referring briefly and additionally to FIG. 3, a diagram 50 shows the first controller 22 detecting the interference 28a-28c by at least performing interference parameter estimation. This includes monitoring 51 bit-error rate (BER), signal-to-noise and distortion ratio, and packet retransmission characteristics. These parameters are monitored and compared with history 52 of received signals. The history is broken into short term (seconds) 53, medium term (hours/days) 54, and long term (weeks/months) 55 statistics. The comparison of link performance parameters with historical data allows the algorithm to advantageously determine the cause of the degradation in link performance, i.e. is it a short term fade or truly interference.

Referring again to FIGS. 1-2, if interference 28a-28c is detected, the method moves to Block 40 where the first controller 22 determines a type of the interference from among a plurality of interference types comprising narrowband interference 28a, wideband interference 28b, and self interference 28c. The first controller 22 determines the relative bandwidth of the interferer to the operating channel. More specifically, the first controller 22 determines the interference type based upon at least one of fade characteristics (flat or frequency selective), noise characteristics (wideband or narrowband), and path characteristics (line-of-sight or multipath).

For example, measurements made as part of the detection portion of the algorithm may be categorized into regions that map into modulation and FEC parameter selections. For interference-avoidance methods, bandwidth determination may often be adequate. In an interference-avoidance aproach, the interference is detected then communications are conducted in regions or zones free from or with minimal interference.

Interference coexistence approaches subdivide in two categories: transmit parameters, such as, modulation type for FEC parameters; and reception processing, such as, adaptive filtering, demodulation decision-region adjustment, or turbo-code transition-probability adjustment.

For interference coexistence methods, the detection schemes may be augmented to become estimation processes to allow for more effective optimization. More parameters may be measured; consequently, this may lead to other categorizations. Also, a monitoring process may be implemented with the algorithm method to adaptively adjust these regions based on effectiveness, based upon a closed-loop process to ensure convergence and stability. Advantageously, probability of success (or equivalently minimized BER) is increased.

Several techniques may be used to accomplish this. The first technique may include scanning a sample of the available channels. The receiver scans the designated operating channels and records the noise floor on each one. A map is created to determine the extent of the interfering source. In the event that the interference appears to be isolated to a small portion of the band, further scans using a smaller step size may be initiated to refine the breadth of the interfering source.

The second technique involves changing the operating channel bandwidth. This may apply to links that are using the 20 MHz or 40 MHz bandwidth setting. The categorization algorithm may monitor the noise floor on the channel at the wider and narrower bandwidths. If the bandwidth is reduced by one half but the noise floor remains constant, then the interferer is narrower than the channel bandwidth. If the noise floor is reduced by one half, then the interferer is wider than the channel bandwidth.

Figure 4:
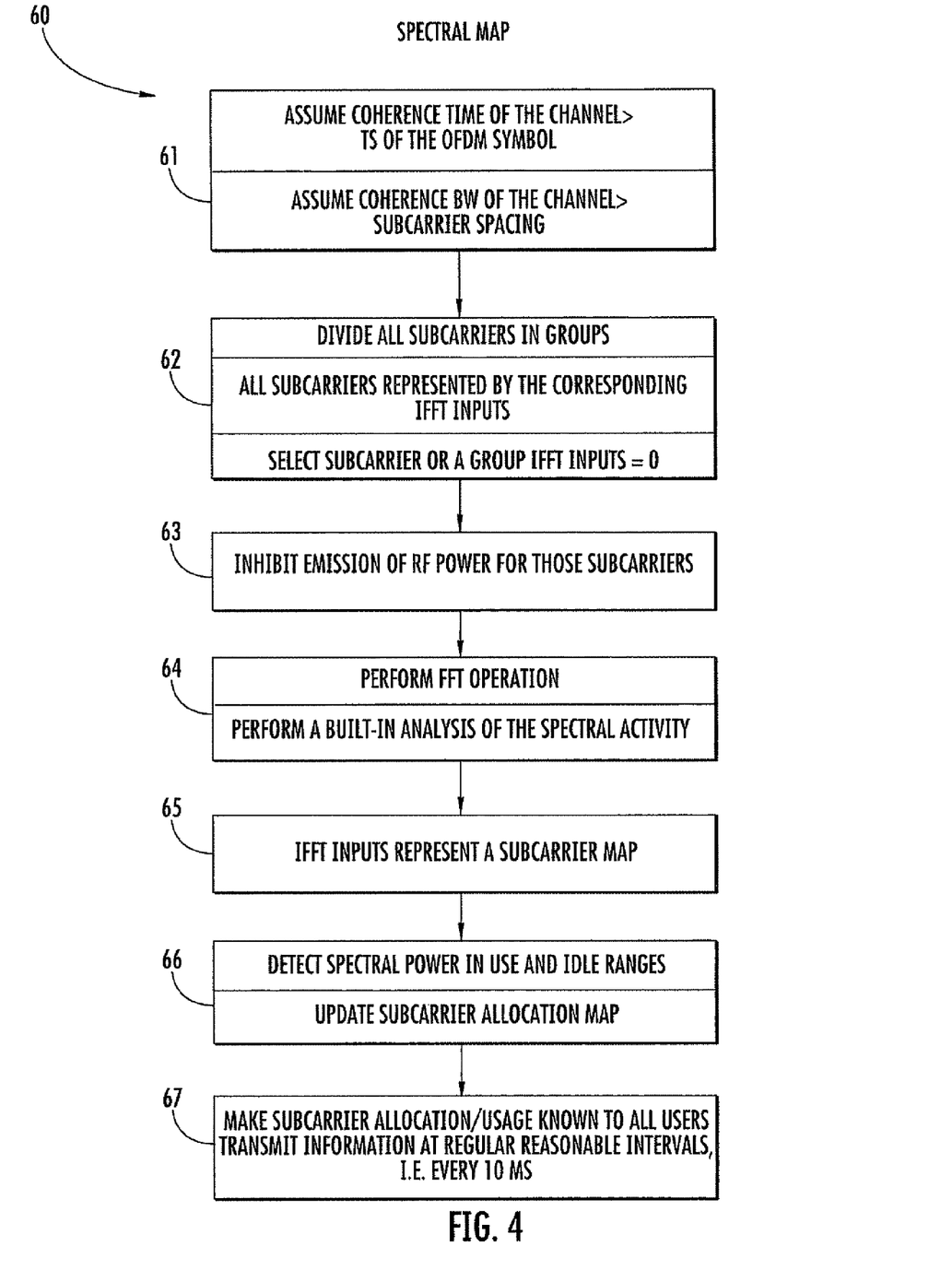
FIG. 4 is a block diagram for an embodiment of the generation of an interference map according to the present invention.

The third technique uses signal processing centered on the Fourier transform associated with the OFDM. The bandwidth of the interferer can be determined through analysis of the spectral components, shown in a diagram 60 of FIG. 4. The method for spectral mapping beings by making assumptions about the coherence time of the channel 61. The OFDM map is then subdivided 62 into groups. Subsequently, a selected group of subcarriers has their emission suspended 63. The fast Fourier transform (FFT/IFFT) is then performed 64 to provide a subcarrier map 65. The spectral power in use and idle ranges are calculated 66. Lastly, subcarrier allocation/usage is transmitted 67 to all users.

Referring again to FIGS. 1-2, at Block 42, the first controller 22 sets the settable link characteristics to compensate for the interference based upon the interference type. The settable link characteristics may comprise at least one receive processing characteristic and/or at least one transmit processing characteristic. The first controller 22 illustratively cooperates with the second controller 26 to set the at least one transmit processing characteristic. In some embodiments, the first controller 22 may independently set the transmit processing characteristic.

The first controller 22 may selectively set the settable link characteristics. In other words, the first controller 22 applies a "recipe" of interference compensation to communications, the recipe being based upon the type of interference detected and a pre-existing priority based algorithm. The following lists give the priority of application for settable link characteristics for narrowband and wideband interferers.

Narrowband Compensation
1. Adaptive power control
2. Narrowband adaptive filtering
3. Adaptive waveform
4. Adaptive channel bandwidth
5. Diversity in Frequency—change operating frequency Wideband Compensation:
1. Adaptive power control
2. Adaptive guard band—use Spectral Map, subcarrier allocation information to deactivate subcarrier
3. Narrowband adaptive filtering
4. Adaptive waveform
5. Adaptive channel bandwidth
6. Diversity in Frequency—change operating frequency
7. Diversity in Time
   a. Change OFDM symbol time
   b. Change OFDM symbol duration for cyclic extension Flexibility to distribute the algorithms, providing enhanced monitoring and more direct compensation to the signal itself, may give better results.

Adaptive power control may permit the first and second wireless communications devices 21, 25 to negotiate transmit power based upon transmission characteristics. By enabling the increase of transmit power to overcome interference sources, it is possible to burn through the interference and therefore increase the signal-to-noise/interference ratio. This method of compensation may be simple and efficient, and should be used as a first line of defense, being noted as the first priority in both compensation method lists above. It is also applicable to narrow and wideband interference 28a-28b sources but not for collocation issues.

Frequency diversity techniques compensate for the interference by changing the operating frequency. This includes techniques, such as, intelligent channel selection where a radio scans its available spectrum and moves to a clean frequency. This technique can be effective at maintaining the data throughput but can require frequency coordination between the first and second wireless communications devices 21, 25.

Diversity in time can be an effective technique for packet based systems that are receiving interference from a pulsed source. By modifying the frame timing, it may be possible to align the pulsed interference to be out of sequence with the desired transmission between the first and second wireless communications devices 21, 25. This may be effective in point-to-multipoint mode where a master can choose the point in time that it uses to transmit to any particular slave (avoiding local interference at the slave).

Adaptive waveform (modulation and FEC) may be adapted based on the amount and type of interference 28a-28c. This includes changing the modulation type and/or the FEC rate to change the required signal-to-noise ratio of the system. The appropriate waveform for any specific type of interference 28a-28c is dependent on the amount and type of interference that is present. It may be helpful to recognize the type of interference 28a-28c when using an adaptive waveform technique. There can be significant differences in system performance that result from matching the correct waveform with the interference 28a-28c. For instance, the process gain that results from different error correction techniques is dependent on the cause of the errors (Reed-Solomon works better for burst errors and convolutional coding works better for random errors). Therefore, it may be helpful to tailor the adaptive waveform algorithm to the type of interference 28a-28c.

In addition to changing the waveform (described above), the channel bandwidth can also be changed to compensate for interference 28a-28c. If the interfering source is wideband, the interferer will appear to be more like Gaussian noise and narrowing the channel bandwidth will reduce the noise within the channel. This improves the overall signal-to-noise ratio by sacrificing channel throughput. However, the opposite may be true for narrowband interferers. If the bandwidth of the interferer is narrower than the channel bandwidth, narrowing the channel bandwidth will result in a higher level of interference 28a-28c within the receiver. Therefore, it may be helpful that the interference 28a-28c be characterized before an interference compensation technique is chosen.

Spatial diversity for signal cancellation or the use of multiple antennas (MIMO) may create an opportunity to use active cancellation to compensate for interference 28a-28c.

The theory behind MIMO is that the multiple antennas receive time shifted versions of a desired and undesired signal. Signal processing is then used to shift the desired signal into phase alignment and the undesired signal out of phase alignment (180 degrees out of phase). This shift in the phase of the signal may result in an improvement in desired signal power and a significant reduction in undesired signal power, therefore improving the overall signal-to-interference ratio. The use of spatial diversity for signal cancellation may not affect the data throughput of the channel and this method should be considered to be one of the primary interference mitigation methods for both wideband 28$b$ and narrowband interference 28$a$.

Null steering can also be used as an interference mitigation technique. This method uses the capability of detecting the direction of arrival for the received interference 28$a$-28$c$. Once the azimuth is determined, a null in the antenna pattern can be steered in the direction of the interfering source. This method works for both wideband and narrowband interferers and adaptive and fixed antenna patterns. However, it does uses either a mechanical or electronically steered antenna. Advantageously, significant reductions in interference power can be achieved using this method.

Referring again to FIGS. 1-2, at decision Block 44, the first controller 22 may optionally repeat the detecting, determining, and setting by returning to Block 34. In other words, the first controller 22 may apply its interference compensation algorithm iteratively. If the received signal does not return to a historical state indicative of interference free transmission, the method returns to Block 34 and the setting of settable link characteristics at Block 42 is adjusted appropriately, i.e. feedback analysis. If the received signal returns to normal historical performance, the method ends at Block 46.

In the embodiments where the first and second wireless communications devices 21, 25 include OFDM transceivers, the first controller 22 generates an interference map of the received interference 28$a$-28$c$ onto OFDM cells. Moreover, the first controller 22 sets the settable link characteristics based upon the interference map.

Figure 5:
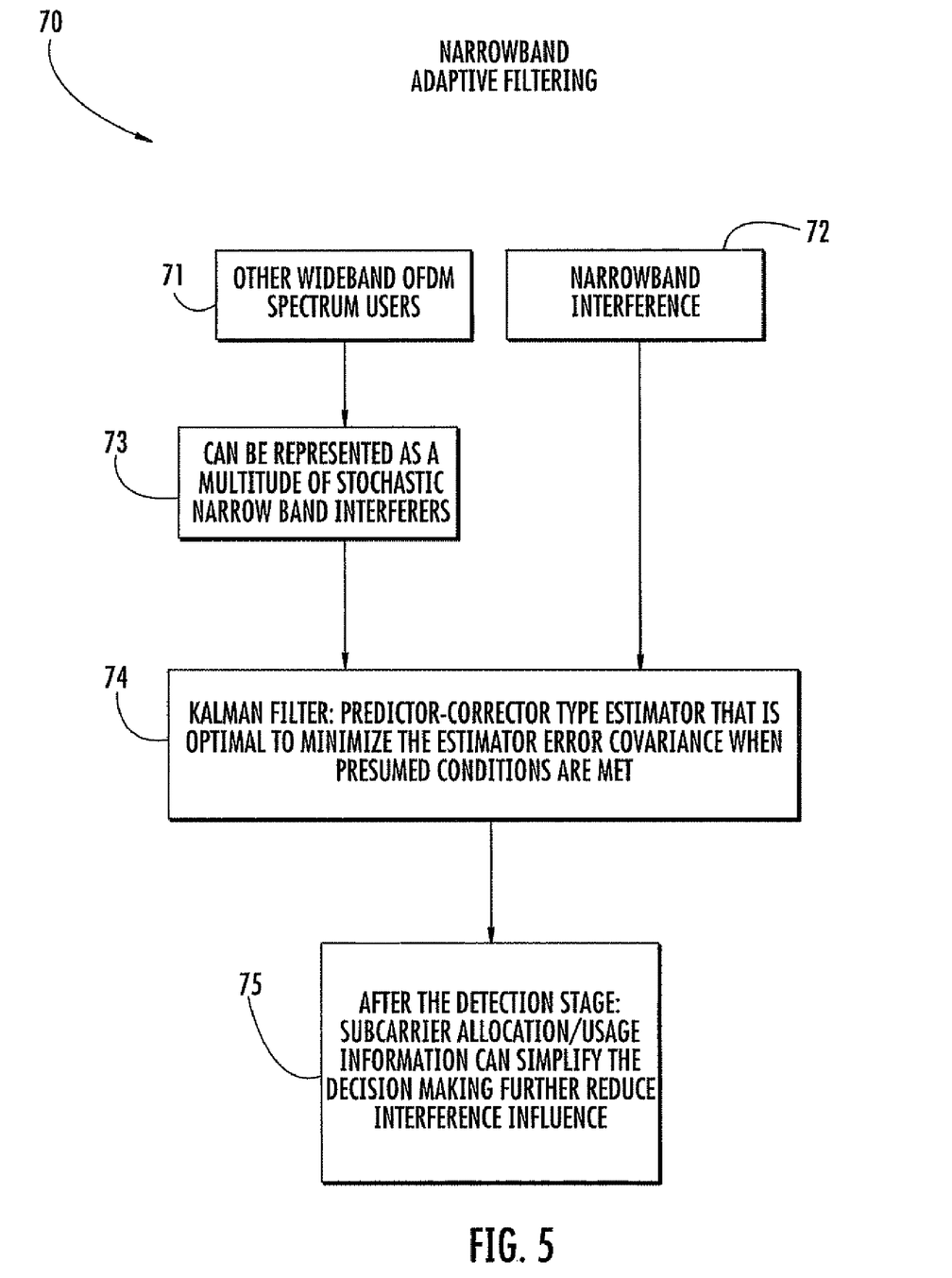
FIG. 5 is a block diagram for an embodiment of the narrowband adaptive filtering according to the present invention.

Referring to FIG. 5, a detailed and exemplary illustration of the algorithm for interference compensation is illustrated. Narrowband adaptive filtering (diagram 70) includes dividing the dividing the interference into wideband (from other wideband OFDM spectrum users) 71 and narrowband 72. The wideband interference is represented 73 as a plurality of stochastic narrowband interferers. A Kalman filter is then applied 74. The subcarrier allocation/usage information is then used 75 in the decision making process.

Figure 6:
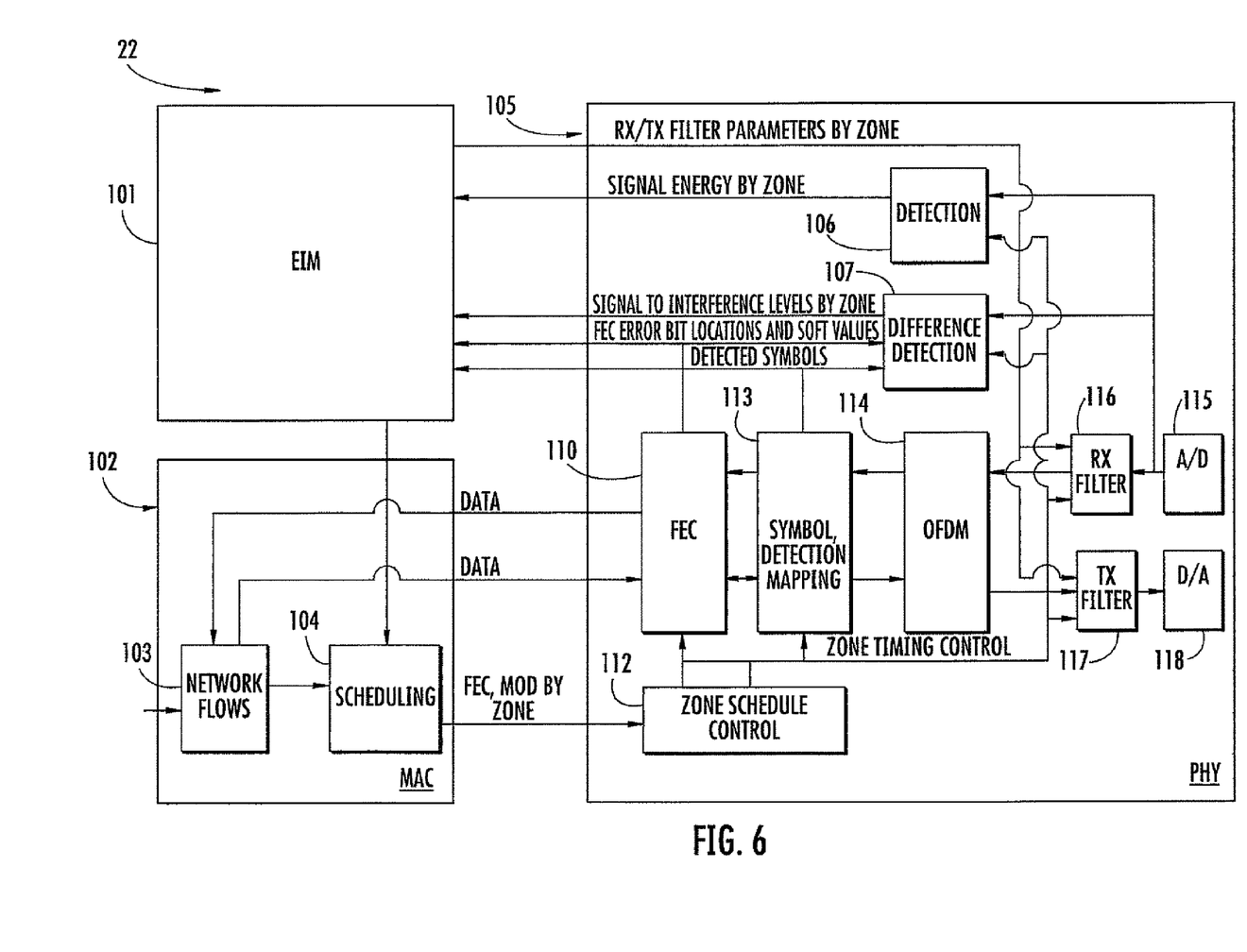
FIG. 6 is a more detailed schematic block diagram of the controller of FIG. 1.

Referring specifically to FIGS. 1 and 6, the first controller 22 illustratively includes an enhanced interference mitigation (EIM) module 101, a media access control (MAC) module 102 coupled to the EIM module, and a physical layer (PHY) module 105 coupled to the EIM module and MAC module. The MAC module 102 includes a network flows block 103 and scheduling block 104 coupled to each other.

The EIM module 101 may execute the EIM algorithms and uses available detection data to build a map of the OFDM cells. This map is provided as input to the scheduling block 104 for informing what FEC and modulation can be used for each zone. As will be appreciated by those skilled in the art, the zone sizes and shapes may be implementation-dependent. Zone types that could span the space from a fixed zone with single symbol duration across subcarriers to a more flexible zone assignment scheme where each symbol duration/subchannel could be assigned a maximum permissible FEC/modulation setting.

The EIM module 101 may request the scheduling block 104 to schedule zones free of transmissions to be used for measurements. The EIM module 101 can vary in sophistication from simply detecting interference levels and recommending frequency switches to highly complex Kalman or H-infinity tracking algorithms, for example.

The network flows block 103 is the source and sink for data referred to as "service flows" or that use the MAC module 102. Quality-of-Service (QoS) and other factors may establish the priority of each flow. The network flows block 103 uses available information from the PHY module 105 based algorithms to determine a good performance metric for a given interference environment. This metric may comprise, for example, a priority-weighted aggregate flow rate through a node.

The scheduling block 104 uses the data from the EIM module 101 along with the network flows requested data rates and associated priorities to schedule data transmission and reception. The data is placed into zones using the EIM maps to optimize the aggregate priority-weighted flow rate. Further, special modes, such as, mesh and coordinating with other nodes in own network, can be performed here, requiring a level of distributed scheduling.

The PHY module 105 includes a detection block 106 for determining if interference 28$a$-28$c$ exists in the received signal and measuring the amount of energy in a specified OFDM cell. The detection block 106 is for zones that have been designated to be free of transmission so that all the detected energy is from interfering sources. This type of block can also make use of cells that include pilot tones to make signal-to-interference measurements since the signal structure of the pilot is known. The detection block 106 processing can vary in complexity from simple power measurement to more complex signal-processing code—for the pilot carrier cells and for characterizing the signal for cases where knowledge of signal structure will help with more effective compensation.

The PHY module 105 illustratively includes a difference detection block 107 for performing signal-to-interference measurements. The difference detection block 107 includes stored algorithms that can use detected signal and FEC data to reconstruct the signal of interest and effectively subtract it from the raw signal to generate signal-to-interference estimates for any specified cell.

The PHY module 105 illustratively includes a FEC block 110 for performing the error correction encoding and decoding. Overall, the FEC block 110 contributes to EIM by including a large number of algorithms and settings to allow finer compensation granularity. The FEC block 110 interfaces with the difference detection block 107 by including a wider range of algorithms to increases the observability compared to the difference detection block described above. For example, if the algorithms determine exact errors bits and soft error values or certainties, then that can be used to better characterize the interference 28$a$-28$c$.

The PHY module 105 illustratively includes a symbol detection and mapping (SDM) block 113 that is similar to the FEC block 110 except modulations and detection algorithms are used in place of error-correcting code. The PHY module 105 also illustratively includes an OFDM block 114 for interfacing with the EIM module 101 by providing the number of frequency bandwidths, carrier spacing, and FFT sizes it supports.

The PHY module 105 illustratively includes an Rx filter block 116 for filtering the signal and compensating for the effects of the interference 28$a$-28$c$. This block may be programmed for zone and anticipated reception. The PHY module 105 illustratively includes a Tx filter block 117 for filtering that compensates for the effects of the interference 28a-28c by applying an inverse matched filter, for example. The Tx filter block 117 may be programmed for zone and anticipated reception.

The PHY module 105 illustratively includes a Zone Schedule Control (ZSC) block 112 for providing an increase in the ability to compensate based on increased flexibility that can be used to place service flow data in zones. The PHY module 105 illustratively includes a analog-to-digital converter 115 feeding into the Rx filter block 116, and a digital-to-analog converter 118 receiving the output of the Tx filter block 117.

This exemplary algorithm may be applied to narrowband and wideband interference 28a-28b. The wireless communication system 20 may associate narrowband interference with the following characteristics: OFDM synchronization and frame detection are intermittent. The subcarrier interference may be associated with a single subcarrier or with groups thereof. The known data symbols in the preamble and pilots are continuously correlated with stored/delayed versions of each other.

The wireless communication system 20 may then filter narrowband interference 28a adaptively by at least combining subcarrier allocation/usage information with narrowband filtering carried out in existing FFT/IFFT processing. The interference 28a-28c may be suppressed before the preamble is fed into the correlation module. When the frequency offset is less than 1% of subcarrier spacing, then it is accurate enough to maintain orthogonality of the OFDM signals.

Wideband interference 28b may be detected when interference is caused by WiFi wireless devices or other wideband systems operating in the operating spectrum of the wireless communication system 20. The side lobes of the sinc-shaped spectra on each subcarrier interfere with subcarriers in use by other systems. The subcarriers in use by the other systems may not be orthogonal with the wireless communication system 20. Power control information may be used, for example, mean interference power difference being large (several percentage points) between subcarriers with and without interference 28a-28c. An adaptive guard band may also be used by deactivating one or more subcarriers adjacent to the subcarriers experiencing the interference 28a-28c. For longer OFDM duration, time domain windowing for OFDM symbols may be used—root raised cosine windows sharpen the spectral pulses on each subcarrier and lower the side lobes resulting in less interference power.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
first and second wireless communications devices configured to communicate with one another via a wireless communications link having at least one settable link characteristic;
said first and second wireless communications devices comprising respective first and second orthogonal frequency-division multiplexing (OFDM) wireless transceivers and respective first and second controllers coupled thereto and configured to store short term and long term historical characteristics of interference;
said first controller configured to
detect received interference,
determine a type of the received interference from among a plurality of interference types comprising wideband interference, self interference, and narrowband interference based upon comparing at least one characteristic of a current received signal with the short term and long term historical characteristics of interference, and
set the at least one settable link characteristic to compensate for the received interference based upon the interference type.

2. The wireless communication system according to claim 1 wherein said first controller is configured to repeat the detecting, determining, and setting.

3. The wireless communication system according to claim 1 wherein the at least one settable link characteristic comprises at least one receive processing characteristic.

4. The wireless communication system according to claim 1 wherein the at least one settable link characteristic comprises at least one transmit processing characteristic; and wherein said first controller is configured to cooperate with said second controller to set the at least one transmit processing characteristic.

5. The wireless communication system according to claim 1 wherein said first controller is configured to generate an interference map of the received interference onto OFDM cells.

6. The wireless communication system according to claim 5 wherein said first controller is configured to set the at least one settable link characteristic based upon the interference map.

7. The wireless communication system according to claim 1 wherein said first controller is configured to determine the interference type based upon at least one of fade characteristics, noise characteristics, and path characteristics.

8. The wireless communication system according to claim 1 wherein the at least one settable link characteristic comprises at least one of transmission power, frequency diversity, time diversity, modulation, forward error correction (FEC), channel bandwidth, and adaptive filtering.

9. A wireless communications device operable to communicate with an other wireless communications device via a wireless communications link having at least one settable link characteristic, the wireless communications device comprising:
an orthogonal frequency-division multiplexing (OFDM) wireless transceiver; and
a controller coupled to said wireless transceiver and configured to store short term and long term historical characteristics of interference;
said controller configured to
detect received interference,
determine a type of the received interference from among a plurality of interference types comprising wideband interference, self interference, and narrowband interference based upon comparing at least one characteristic of a current received signal with the short term and long term historical characteristics of interference, and
set the at least one settable link characteristic to compensate for the received interference based upon the interference type.

10. The wireless communications device according to claim 9 wherein the at least one settable link characteristic comprises at least one receive processing characteristic.

11. The wireless communications device according to claim 9 wherein the at least one settable link characteristic comprises at least one transmit processing characteristic; and wherein said controller is configured to cooperate with the other wireless communications device to set the at least one transmit processing characteristic.

12. A method for compensating interference in a wireless communication system comprising first and second orthogonal frequency-division multiplexing (OFDM) wireless communications devices communicating with one another via a wireless communications link having at least one settable link characteristic, the method comprising:

detecting received interference;

storing short term and long term historical characteristics of interference;

determining a type of the received interference from among a plurality of interference types comprising wideband interference, self interference, and narrowband interference based upon comparing at least one characteristic of a current received signal with the short term and long term historical characteristics of interference; and setting the at least one settable link characteristic to compensate for the received interference based upon the interference type.

13. The method according to claim 12 further comprising repeating the detecting, determining, and setting.

14. The method according to claim 12 wherein the at least one settable link characteristic comprises at least one transmit processing characteristic; and further comprising cooperating between the first and second wireless communications devices to set the at least one transmit processing characteristic.

* * * * *